United States Patent [19]
Green et al.

[11] 3,807,280
[45] Apr. 30, 1974

[54] SERVO MOTORS

[75] Inventors: Ronald Frederick Green, Solihull; Stephen John Nicholas, Warwick, both of England

[73] Assignee: Girling Limited, Birmingham, England

[22] Filed: Dec. 15, 1971

[21] Appl. No.: 208,354

[30] Foreign Application Priority Data
Dec. 22, 1970  Great Britain.................... 60734/70

[52] U.S. Cl. ................................ 91/369 B, 91/376
[51] Int. Cl. ............................................. F15b 9/10
[58] Field of Search .......... 91/369 B, 369 A, 369 R, 91/376

[56] References Cited
UNITED STATES PATENTS

| | | | |
|---|---|---|---|
| 2,989,033 | 6/1961 | Stelzer............................ | 91/369 B |
| 3,013,533 | 12/1961 | Brown............................. | 91/369 B |
| 3,316,816 | 5/1967 | Yardley........................... | 91/369 B |
| 3,661,054 | 5/1972 | Brown............................. | 91/369 B |

*Primary Examiner*—Paul E. Maslousky
*Attorney, Agent, or Firm*—Scrivener Parker Scrivener & Clarke

[57] ABSTRACT

A differential pressure operated servo booster has a valve comprising a flexible closure member carried by a movable wall and cooperating with a pair of annular valve seats formed on a valve body which is movable by an input rod. The valve body is formed in two co-axial parts, the outer part having the pair of valve seats and the inner part being connected to the input member, a spring being arranged between said inner and outer parts to resiliently urge the outer part against the valve closure member. Reaction is therefore determined by the spring and not by the force with which the valve seats are urged against the closure member. Assembly of the booster is facilitated by providing an inner valve body of two-part construction.

There is also disclosed an adjustable abutment between a fulcrum plate which contacts the movable wall and an output member. Such adjustability provides for ease of initial adjustment of the booster.

A split collar retention member is described which has a frusto-conical outer configuration and a part-spherical inner configuration. The retention member functions to retain a ball end of an input rod within the valve body.

11 Claims, 3 Drawing Figures

PATENTED APR 30 1974  3,807,280

SERVO MOTORS

This invention relates to differential pressure operated boosters or servo motors, especially for vehicle braking systems, of the kind in which a load operating member is displaceable by the application of differential fluid pressure to a movable wall.

Systems employing such boosters usually function under the control of a valve which is arranged to alter the pressure on one side of the movable wall relative to that on the other side, and it is recognized that it is desirable to provide on the operating member of the valve, a reaction which the operator can sense and which is proportional to the degree of pressure differential established between the two sides of the wall. In a vehicle braking system, for example, the operator then experiences the "feel" of the brakes, which assists him to control the extent to which they are applied.

One convenient way of providing the required reactional feel is to arrange for the movable wall to be deformed conically, or dish, responsive to the pressure differential when the booster is energized and to transmit reaction resulting from this deformation back to the operator through one or other of two concentric valve seats which together with part of the movable wall comprise the valve.

In the booster disclosed in our British Pat. No. 1,144,567 the movable wall is an annular elastic diaphragm which is radially and circumferentially supported by a so-called deflecting plate formed with radial slots to enable it to dish, cone, or to deflect responsive to differential pressures on its two sides. The deflecting plate pivots alternatively about one or other of the concentric valve seats according to whether air has been admitted to the unit to actuate the booster to apply the brake or air is being withdrawn from the unit to relieve the brakes. Because the valves are concentric the pivot arm is shorter when the lever pivots about the outer valve to open the atmosphere connection than when it pivots about the inner valve to open the vacuum connection, and this pivot arm determines the boost ratio of the device so that for instance a booster output of 120 lbs. could require, during the application, a loading of 40 lbs. but during partial braking relief a load of only 30 lbs. A differential load requirement of this order would require reduction of a quarter of the operator's pedal effort before relief of braking commenced, giving the driver the impression that the brakes were "holding on."

The present invention seeks to reduce the differential force requirements to an acceptable and controllable level, without eliminating it entirely, so that the operator does not lose the "feel" of the brakes.

According to one aspect of the present invention, therefore, there is provided a differential pressure operated servo booster of the type in which a load actuator member is displaceable by the application of differential fluid pressure across a movable wall which incorporates a deflecting plate, the booster having a valve to selectively alter fluid pressure on one side of the movable wall relative to that on the other side, the valve comprising a flexible valve closure member, an inner load transmitting member and an outer valve body member which has a pair of concentric valve seats, the outer valve body member being slidably mounted concentric with the inner member and being spring-load with respect to the inner member.

In this aspect of the invention the deflecting plate pivots about a point on the inner member and the valve seats are biassed towards the valve closure member carried on the deflecting plate by virtue of the fact that the outer valve body is biased relative to the inner member, preferably by means of a spring which may be made stronger or weaker thus allowing control of the degree of bias of the valve seats towards the closure member. Thus, when the booster is actuated and the deflecting plate dishes, the valve closure member contacts the outer valve seat causing the valve body to move relative to the inner member with consequential compression of the spring. When the deflecting plate is fully dished, the spring will be in a state of compression and the force with which the valve seat contacts the closure member will be determined entirely by the spring rather than by the load being applied to the booster.

When the brakes are first applied there will be no reaction on the valve seat but as the deflecting plate starts to dish reaction will build up to the point where the deflecting plate is fully dished when the reaction will remain constant, governed by the spring.

According to a second aspect of the invention, there is provided servobooster of the type described which comprises a fulcrum plate which at its periphery abuts a deflecting plate and at its centre abuts an adjustable collar of an output member. Conveniently, the output member is a rod and the adjustable collar may comprise a nut screwed onto the output rod.

This adjustable arrangement facilitates the assembly and initial adjustment of the servo booster as follows. During assembly, air at approximately 10 p.s.i. may be applied to the booster and the abutment collar on the output member adjusted until the deflecting plate pivots sufficiently to open the air valve and release the pressure when the adjustable collar may be backed off a predetermined amount. This arrangement has the advantage that small deviations in the tolerances of individual units may be compensated for.

A third feature of the invention, resides in the fact that the valve inner member is of two-part construction for ease of assembly. Thus, the invention includes a method of assembling a servo booster of the type described which comprises positioning a first portion of a inner member, sliding a concentric outer valve body over said first portion, positioning a spring on an annular shoulder of the outer valve body and bringing a second portion of the inner member into fixed engagement with the said first portion whereby to produce a complete inner member having the outer valve body and spring trapped between raised shoulders at either end thereof. The two-part construction of the inner member allows the above method of assembly which would not be possible were the inner load transmitting member of one piece construction.

According to a further feature of the invention a retention member for a ball-ended input member of the servo booster comprises a split collar of frusto-conical outer configuration and part spherical inner configuration the collar being adapted to clip onto, circumscribe and frictionally engage a ball-ended rod.

The invention will be described further, by way of example, with reference to the accompanying drawings, in which.

Figure 1:
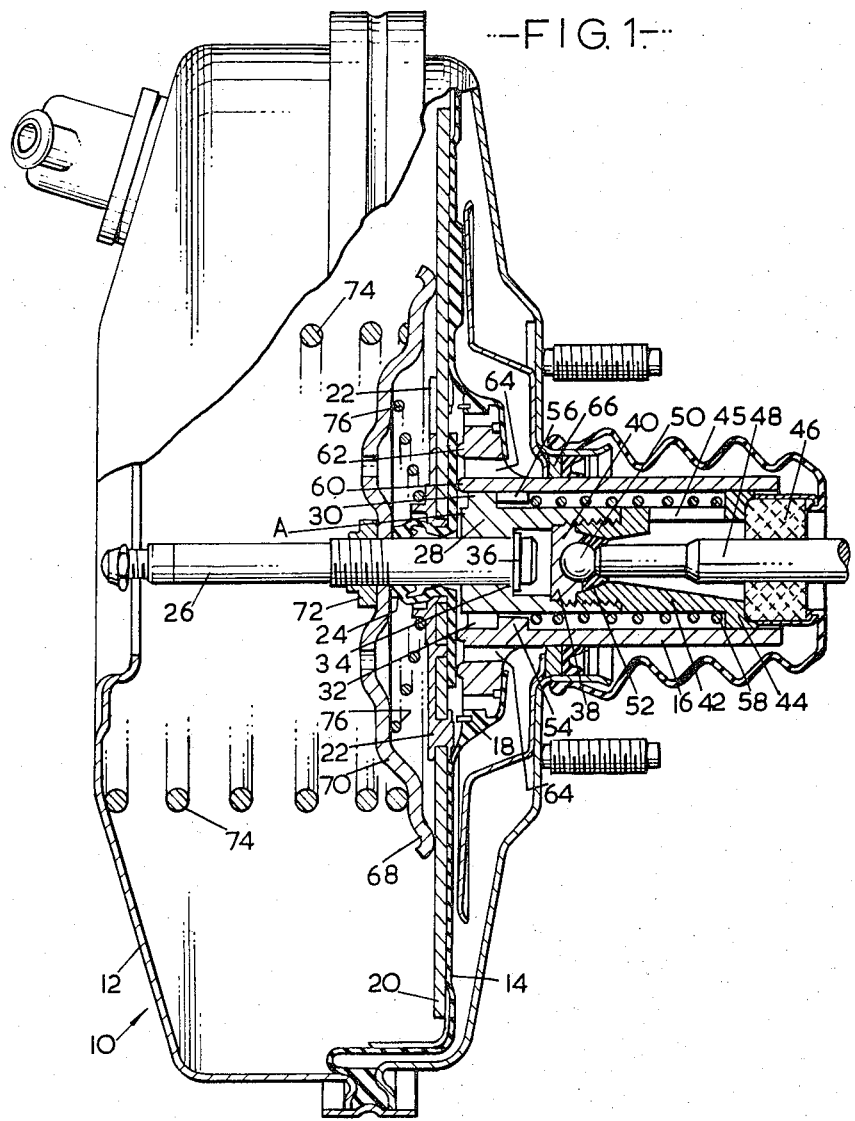
FIG. 1 is a view, partly in section, of a brake booster constructed according to the invention.

Referring to the drawings, a brake booster generally designated 10 comprises a housing 12 containing a resilient diaphragm 14 fixed to the housing, as disclosed in our British Pat. specification No. 1,140,611. The diaphragm 14 is attached, towards its centre, to a valve outer body member 16, by means of a "garter" ring 18. The diaphragm 14 is supported by a deflector plate 20 which comprises a number of rigid radially outwardly divergent fingers held in a resilient member 22 described more fully in our co-pending U.S. Pat. application No. 24,567,170. A valve closure member 24 is arranged adjacent the centre of the deflecting plate 20 and is in fluid sealing engagement with an output rod 26 in a similar manner as disclosed in our British Pat. specification No. 1,144,567.

Figure 2:
FIG. 2 is a sectional view of a retention collar.
Figure 3:
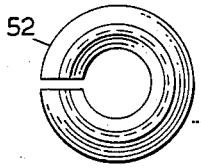
FIG. 3 is a plan view of the retention collar of FIG. 2.

The load transmitting assembly comprises a first inner valve member 28 which carries a radial flange 30 having passages 32 passing therethrough. The member 28 also has a radial shoulder 34 which forms an abutment for a collar 36 on the output rod 26. A further shoulder 38 in the member 28 provides an abutment for a thrust member 40. A second inner member 42 is in threaded engagement with the valve member 28. The second inner member 42 carries an annular flange 44 at is end remote from that engaged with the first inner valve member. A passageway 45 is provided in a member 42. A filter 46 abuts the valve member 42 and circumscribes an input rod 48. The input rod 48 is ball ended at 50 and the ball engages in the thrust member 40. The input rod 48 is retained in fixed relationship with the load transmitting inner member by means of a split collar 52 (more clearly shown in FIGS. 2 and 3) which engages the ball 50 and abuts an inclined shoulder in the second inner valve member 42. As can be seen most clearly from FIGS. 2 and 3, the split collar is of frusto-conical, outer configuration to engage with the inclined shoulder in the second inner portion 42 and has a part-spherical inner configuration to frictionally engage ball end 50.

The outer body 16 is concentric with the inner valve assembly (comprising members 28 and 42) and is in slidable engagement therewith by virtue of an inwardly radially directed flange 54 which contains a passageway 56. A spring 58 is located between the flange 54 of the outer valve body 16 and the shoulder 44 of the inner value valve assembly. This spring 58 biases the flange 54 and the valve outer body 16 into contact with the shoulder 30 on the inner assembly. The valve outer body 16 also carries concentric annular valve seats 60 and 62 and air passageway 64. The whole valve assembly (comprising body 16 and members 28 and 42) can move relative to the housing by virtue of the seal and bearing arrangement 66 which is substantially identical to that disclosed in the previously referred to British Pat. specification No. 1,144,567.

The valve closure member 24 abuts the inner valve body 28 at the point marked A in FIG. 1 and therefore the deflecting plate 20 pivots about this point, or more correctly, annulus. The deflecting plate 20 also pivots about the peripheral bead 68 of a dished flucrum plate 70. Fulcrum plate 70 transmits the force developed by the air pressure on the righthand side of the deflecting plate to the output rod 26 via a collar 72. The collar 72 is adjustable with respect to the output rod 26 in that it is in threaded engagement with the output rod 26.

The inner load transmitting assembly is in two portions 28 and 42 to facilitate assembly of the booster. The portion 28 is positioned on the output rod first of all, and the thrust member 40, input rod 48 and split collar 52 placed in position. The valve outer body is also placed in position over the first portion 28. Finally, the second portion 42 of the inner member is screwed into engagement with the first portion 28 with the spring 58 being trapped between the shoulder 44 on the inner member and the flange 54 on the valve outer body, the filter 46 then being placed in position. The righthand side compartment is then slightly pressurized and the collar 72 adjusted until the deflecting plate dishes sufficiently to engage the valve seat 62 and clear the valve seat 60 thus releasing the excess pressure by virture of air passage 64. The collar is then released by a predetermined amount, for example, two complete turns, and the booster is then adjusted ready for use.

FIG. 1 shows the brake booster in its unloaded or "off" position and its operation will be described by referring to the application and release of the vehicle brakes starting from this position. A load is applied to the input rod 48 which is transmitted via the thrsut member 40 and the shoulder 38 to the inner load transmitting assembly which abuts the deflecting plate 20 via the valve closure member 24 at the point A and therefore causes the deflecting plate 20 to dish inwardly about the annulus 68. This dishing action causes the valve closure member to abut the valve seat 62 and clear the valve seat 60 thus opening the air passage 64 to atmosphere via the passages 32, 56 and 45. The righthand compartment of the booster is thereby brought up to atmospheric pressure. The lefthand compartment, by virtue of a connection with a vehicle inlet manifold or the like, is maintained at a degree of vacuum and the differential pressure causes the diaphragm 14, and thus the deflecting plate 20, to move to the left. The force is transmitted from the deflecting plate to the fulcrum plate by the annulus 68 and thence by way of the collar 72 to the output rod 26 which would normally be connected to the brake master cylinder (not shown), During this phase of braking the whole of the inner booster assembly, i.e., the valve assembly, diaphragm and deflector plate assembly, fulcrum plate and output rod, move to the left. As the deflecting plate 20 dishes, by virtue of the point A moving to the left and the annulus 68 being biased to the right by springs 74, 76, the abutment of the deflecting plate via the valve closure member on the outer valve seat 62 becomes progressively stronger. However, this load is taken up by the spring 58 and the point A remains in contact with the deflecting plate at all times. Thus, as the servo booster is operated from zero input load to a point where the deflecting plate 20 is fully dished the spring 58 is progressively compressed and the amount of reaction fed back to the input rod via the valve seat is controlled entirely by the spring 58, the remainder of the reaction being transmitted directly through the valve inner assembly by the point A. When it is desired to hold a certain braking effort the input rod 48 is held steady and the diaphragm continues to move to the left a small distance until the valve closure member 24 abuts the inner valve seat 60 as well as the outer valve seat 62, thus closing off the air passage 64. In this position the booster is in equilibrium and a constant load is being applied to the brake master cylinder via the output rod 26 which just balances the reaction being fed back by the brake master cylinder.

On reducing the load on the input rod 48, the deflecting plate dishes to the right by virtue of the spring 76 and abuts the inner valve seat 60 but clears the outer valve seat 62 thus connecting the air passage 64 with the lefthand compartment of the booster by virtue of air passages (not shown) in the deflecting plate thus equalizing the pressure both sides of the diaphragm 14. Reaction from the brake master cylinder and the spring 74 then causes the inner assembly to move to the right until the "off" position shown in FIG. 1 is again reached and the deflecting plate 20 will once again straighten.

In the embodiment shown in FIG. 1 the inner valve seat 60 is raised slightly with respect to the outer valve seat 62 so that in the equilibrium position the deflecting plate will be slightly dished to the left but it is possible for the valve seats to be of the same height in which case in the equilibrium position the deflecting plate will be substantially flat.

The various features of the invention, particularly as embodied in the above described booster, may result in the following advantages over known constructions. Firstly, immediately brake application is made, apart from a small delay while the deflecting plate moves to abut the outer valve seat 62, air is introduced to the righthand side of the diaphragm. Owing to the constant pivot point A, the diameter of the inner and outer valve seats may be reduced thus enabling the overall assembly to be made smaller. The construction of the valve assembly is somewhat cheaper and is far easier to assemble than prior boosters in which the valve assembly is a one piece casting. Finally, the collar 72 allows each individual unit to be separately adjusted before use thus compensating for deviations of tolerances of individual boosters.

We claim:

1. A differential pressure operated servo booster comprising a housing, a movable wall dividing said housing, a deflector plate supporting said movable wall and a valve to selectively alter fluid pressure on one side of said movable wall relative to the other side, said valve comprising a flexible valve closure member movable with said movable wall, a load transmitting member, a valve body member slidably mounted concentric outwardly of said load transmitting member, a pair of concentric valve seats on said valve body member, respective abutments on said load transmitting member and said valve body member, and a preloaded compression spring arranged between said abutments to bias said outer body member relative to said load transmitting member towards said flexible valve closure member.

2. A servo booster according to claim 1, wherein said outer valve body member is in sliding contact with said load transmitting member.

3. A servo booster according to claim 1 wherein said flexible valve closure member is carried on said deflecting plate.

4. A servo booster according to claim 1 wherein said load transmitting member is of two-part construction.

5. A servo booster according to claim 4 wherein the two parts of said load transmitting member are in screw threaded engagement.

6. A servo booster according to claim 4, wherein a separately formed thrust member is incorporated into said load transmitting member.

7. A differential pressure operated servo booster comprising a housing, an output member, a movable wall dividing said housing, a deflector plate supporting said movable wall, a fulcrum plate which at its periphery abuts against said deflector plate, stop means on said output member abuting against a central region of said fulcrum plate, and valve means for selectively altering fluid pressure on one side of said movable wall relative to the other side, said valve means comprising a flexible valve closure member movable with said movable wall, a valve body member and a pair of concentric valve seats on said valve body member for cooperation with said flexible valve member, said stop means being adjustable along said output member whereby to adjust said flexible valve closure member with respect to both of said concentric valve seats.

8. A servo booster according to claim 7 wherein said output member is a rod and said stop means is a nut in threaded engagement with said rod.

9. A method of adjusting a servo booster constructed in accordance with claim 7 comprising the steps of applying a differential pressure across said movable wall, adjusting said stop means along said output member until said differential pressure is removed and adjusting said stop means by a predetermined amount in an opposite direction.

10. A method of assembling a servo booster constructed in accordance with claim 6 wherein said abutment on the load transmitting member is on one part thereof and there is a second abutment on the second part axially spaced from said first abutment, said method including the steps of positioning said second part of said load transmitting member, sliding said valve body member over said second part until the abutment on the former engages the abutment on the latter, positioning said spring on the abutment of the valve body, and bringing the first part of said load transmitting member into fixed engagement with said second part to thereby produce a composite load transmitting member having the abutment of the valve body and the spring trapped between the respective abutments of the load transmitting member.

11. A method according to claim 10 including positioning a thrust member, a ball end of an input member and a retention member between said first and second parts.

* * * * *